March 3, 1931. R. E. NEWELL 1,794,530
FURNACE CONTROL APPARATUS
Filed July 8, 1929

INVENTOR
Robert E. Newell,
By Archworth Martin,
Attorney.

Patented Mar. 3, 1931

1,794,530

UNITED STATES PATENT OFFICE

ROBERT E. NEWELL, OF IRWIN, PENNSYLVANIA

FURNACE-CONTROL APPARATUS

Application filed July 8, 1929. Serial No. 376,708.

My invention relates to furnace control apparatus and more particularly to apparatus for regulating the temperatures of furnaces, but it is susceptible of use in various other relations.

One object of my invention is to provide apparatus for controlling from a remote point, the operating pressures of damper regulator devices.

Another object of my invention is to provide regulator apparatus for furnaces and the like wherein the temperatures of the furnace may be controlled by a simple room control.

Another object of my invention is to provide a damper regulator for furnaces, wherein the use of a counterbalancing weight is eliminated.

Still another object is to provide means responsive to outside temperatures for automatically effecting adjustment of a furnace regulator to cause regulation thereof in accordance with the atmospheric conditions.

A further object of my invention is to simplify and improve generally the structure and operation of furnace regulators.

Figure 1:
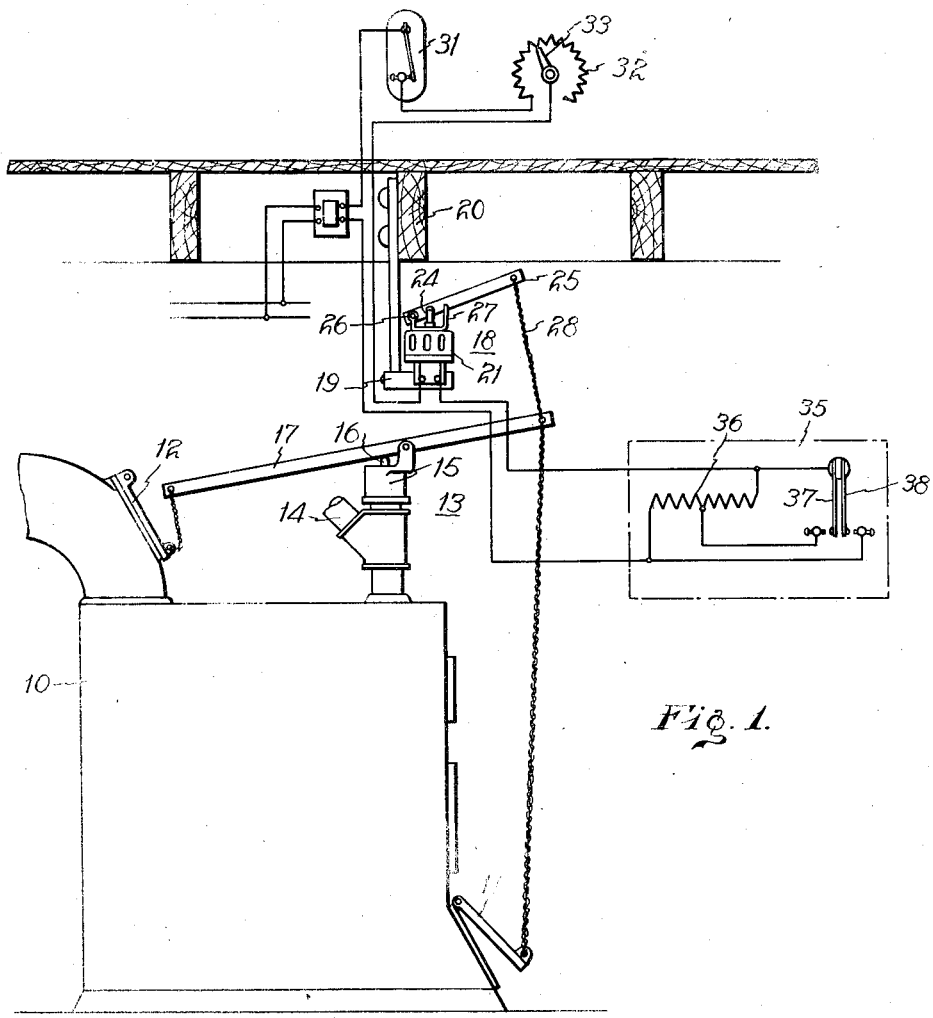
Figure 2:
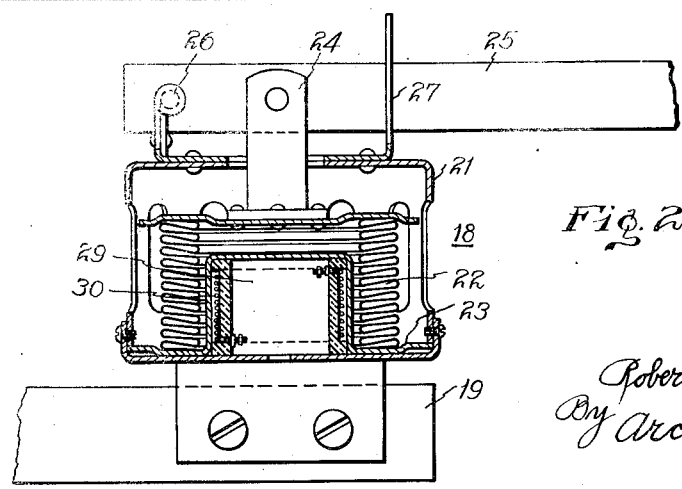

One of the forms which my invention may take is shown in the accompanying drawing, wherein Figure 1 is a somewhat diagrammatic view of a system embodying my invention, and Fig. 2 is a sectional elevational view of a portion of the apparatus of Fig. 1.

Referring to Fig. 1 of the drawing, I show a furnace or boiler 10 having a draft damper 11 and a check damper 12. By the manipulation of the dampers the rate of combustion in the furnace, and consequently the temperature thereof, may be controlled, and in order to automatically control the combustion in accordance with the temperature, I provide a damper regulator device 13.

The actuating mechanism of the regulator is associated with a delivery pipe 14, through which the heat medium is conducted to the various rooms or apartments.

The damper regulator device 13 may be a usual type well-known in the art, wherein a casing 15 contains a thermostat or pressure element having an operating plunger 16 to oscillate a damper arm 17 which is pivotally mounted on the casing 15. The damper arm is connected to the dampers 11 and 12, so that upon movement in one direction, the damper 11 will open and the damper 12 will close, and with movement in the opposite direction the damper 11 will close and the damper 12 will open. Ordinarily with this type of damper regulator, weights are provided for controlling the pressures at which the damper arm will be oscillated. Adjustment of the weights is necessary to vary the regulator operating pressures, which necessitates the inconvenience of a trip to the basement, and further, the weights are sometimes located in a position not readily accessible.

In order to eliminate the use of weights, I provide an electro-thermal device 18 for adjustably controlling the operating pressures of the damper regulator 13. The electro-thermal device 18 is mounted on a bracket 19 which is suitably secured to a joist of the floor, or in any other suitable manner. The device 18 as shown more clearly in Fig. 2, comprises a casing 21 in which a thermostat or heat responsive element 22 is mounted. The lower end of the thermostat 22 is secured to a plate 23 which is rigidly secured to the bottom of the casing 21, while the upper end is free to move in vertical directions during expansion and contraction thereof.

A plunger 24 is secured to the free end of the thermostat 22 and has pivotal connection with a lever 25. The lever 25 is pivotally mounted as at 26 to a supporting bracket 27 which is secured to the casing 21. The outer end of the lever 25 has operative connection as by means of a chain 28, Fig. 1, with the draft damper end of the damper arm 17 for a purpose to be hereinafter described.

The plate 23, hereinbefore mentioned, has a cup-like extension, to provide a recess 29 which extends interiorly of the thermostat and is adapted to receive and position a resistor element 30 in heat-transfer relation therewith. The thermostat may be filled with a predetermined amount of gas or liquid, so that when electric current is passed through the resistor 30, the thermostat will expand to operate the lever 25. The circuit through the resistor 30 is normally closely by a thermal switch 31 that is disposed in a room which is to be heated by the furnace, so that when the temperature of the room reaches a predetermined degree the switch will operate to open the circuit. The thermal switch may be of various types well-known in the art and need not therefore be described in detail.

The thermostat will be caused to expand, by the heat generated by the current, passing through the resistor 30, with power sufficient to cause the lever 25 to exert a predetermined force on the damper arm 17. This force, when the switch 31 is closed, is constantly maintained on the damper arm in opposition to the pressure exerted by the damper regulator device 13. The pressure exerted by the device 18 on the damper arm 17 may be sufficient to overcome the pressure exerted by the device 13 thereon and the dampers 11 and 12 will be maintained in the open and closed position respectively.

However, as the pressure of the device 13 is in accordance with the furnace temperature, upon rise in furnace temperature, the pressure will increase to overbalance the pressure of the device 18, thereby causing the damper arm 17 to operate to open the damper 12 and close the damper 11. In this manner, the power of the electro-thermal device 18 causes the damper regulator device 13 to regulate the furnace at predetermined temperatures, without the necessity of providing adjustable weights on the lever 17.

An increase or decrease of power in the device 18 results in an increase or decrease in pressure exerted thereby on the damper arm 17, thus causing actuation of the dampers at desired higher or lower furnace temperatures. In order to vary the power of the device 18, in accordance with heat demands, I provide an electrical control device or an adjustable rheostat 32, which may be of any type well-known in the art, for controlling the current passing through the resistor 30. The device 32 is preferably conveniently located in one of the rooms or at a point which is remotely disposed from the furnace. By the simple manipulation of the adjustable arm 33 of the rheostat 32, the heat generated by the resistor 30 is controlled to vary the power of the device 18.

Due to the constantly varying outside temperatures, the heat demands are proportionately increased or decreased. By the provision of an automatic compensator device which is responsive to the outside temperature, the electro-thermal device 18 is automatically controlled in accordance with atmospheric conditions.

The compensator device 35 is exposed to the outside temperatures and is shown in the drawing as being subject to a mild temperature. The device 35 comprises a resistor element 36 and a plurality of thermal switches 37 and 38 that are progressively closed on lowering temperatures to short-circuit portions of the resistor 36 which is electrically connected in the circuit of the heating element 30 of the electro-thermal device 18. Any desired number of thermal switches such as 37 and 38 may be used and they may be adjusted to close progressively at predetermined temperatures.

As shown in the drawing, three points of compensation are provided, whereby, with a mild outside temperature, all of the resistor 36 is in circuit with the heater of the electro-thermal device 18, to limit the power thereof, thus causing regulation of the furnace at a low temperature. By decrease in outside temperature, switch 37 closes, short-circuiting a portion of the resistor 36 and permitting regulation of the furnace at a higher temperature. A further decrease in outside temperature causes switch 38 to close, thereby short-circuiting the resistor 36, thus permitting regulation of the furnace at a still higher or maximum temperature.

In this manner, the electro-thermal device is automatically controlled in accordance with outside temperatures with a consequent saving in fuel and maintaining a more constant desired room temperature. The damper arm 17 is differentially actuated by the pressure which is varied in accordance with furnace temperatures, and by the counterbalancing pressure which is varied in accordance with atmospheric conditions and heat demands.

Another advantage of my invention resides in the fact that by adjusting the rheostat to a predetermined position, the furnace will be regulated to supply heating medium in accordance with night demands which are usually much lower than day demands.

While I have illustrated and described one embodiment of my invention, it is to be understood that various changes and modifications may be made in the structure and operation without departing from the scope of the appended claims.

I claim as my invention:—

1. Heat-regulating apparatus comprising a lever for controlling a furnace, a thermostat responsive to variations in furnace temperature conditions for actuating said lever in one direction, a second thermostat for actuating said lever in the other direction, heater means for actuating the second-named thermostat, and means for controlling the said heater means to control the actuating temperature of the second-mentioned thermostat.

2. Heat-regulating apparatus comprising a thermo-sensitive element controlled by room temperatures, a thermo-sensitive element controlled by furnace temperatures, a furnace control device movable in opposite directions to control a furnace, and means operatively connecting said elements with said device for effecting actuation of said device in one direction by the differential action of said elements, and for effecting actuation of said device in the opposite direction by the second-named element independently of the first-named element.

3. Heat-regulating apparatus comprising a thermo-sensitive element controlled by room temperatures, a thermo-sensitive element controlled by furnace temperatures, a furnace control device, means for effecting actuation of said device by the differential action of said elements, and means responsive to an increase in room temperature to a predetermined degree for causing the first-mentioned element to be ineffective to actuate said device.

4. Heat-regulating apparatus comprising a lever for controlling a furnace, a thermostat responsive to variations in furnace temperature conditions for actuating said lever in one direction, a second thermostat for actuating said lever in the other direction, a resistor element for heating said second thermostat to a predetermined degree, an energizing circuit for said resistor, and means actuated by room temperatures for controlling energization of said resistor, said means effective to de-energize said resistor when room temperature increases to a predetermined degree.

5. Heat-regulating apparatus comprising a furnace regulator device actuated in accordance with furnace temperature conditions, an electro-thermal device actuated in accordance with room temperature conditions and operatively connected to said regulator device for opposing the actuation thereof, to control the temperatures of the furnace at which the said regulator will be actuated and means actuated in accordance with outside temperatures for controlling said electro-thermal device.

6. Heat-regulating apparatus comprising a lever for controlling a furnace, a thermostat responsive to variations in furnace temperature conditions for actuating said lever in one direction, a second thermostat for actuating said lever in the other direction, heater means for actuating the second-named thermostat, and means for automatically controlling the actuating temperature of the second-mentioned thermostat in accordance with outside atmospheric temperatures.

7. Heat-regulating apparatus comprising a thermostat responsive to furnace temperature conditions, a second thermostat, a furnace control lever differentially actuated by said thermostats, a resistor element for heating said second thermostat, an energizing circuit for said resistor, and a plurality of thermal switches progressively actuated by variations in outside temperature for controlling the resistance of said heater circuit.

8. The combination with a furnace regulator device, of an expansible element controlled by furnace temperatures for actuating said device, a second expansible element indirectly controlled by room temperatures for actuating the said device in opposition to the first-named element, and adjustable means for controlling the actuation of the second-named element.

9. The combination with a furnace regulator device, of an expansible element controlled by furnace temperatures for actuating said device, a second expansible element indirectly controlled by room temperatures for actuating the said device in opposition to the first-named element, adjustable means for controlling the actuation of the second-named element, and means actuated in accordance with outside temperatures for controlling the actuation of the second-named element.

10. Heat-regulating apparatus comprising a furnace regulator device, an expansible element responsive to variations in furnace temperature conditions for actuating said device, a second expansible element for actuating said device, heater means for actuating said second element, means responsive to variations in room temperatures for actuating said heater means, and adjustable means for controlling the actuating temperatures for the said second element.

11. Heat-regulating apparatus comprising a furnace regulator device, an expansible element responsive to variations in furnace temperature conditions for actuating said device, a second expansible element for actuating said device, heater means for actuating said second element, means responsive to variations in room temperatures for actuating said heater means, and means actuated in accordance with outside temperatures for controlling the actuating temperatures for the said second element.

12. Heat-regulating apparatus comprising a furnace regulator device, an expansible element responsive to variations in furnace temperature conditions for actuating said device, a second expansible element for actuating said device, means for electrically heating said second element, means responsive to variations in room temperatures for controlling energization of the heater circuit to control the actuating temperatures for the said second element, and a plurality of thermal switches progressively actuated by variations in outside temperature for controlling said heating means.

13. Furnace control apparatus comprising a furnace regulator device actuated in accordance with furnace temperatures, an electro-thermal device actuated in accordance with room temperatures, and an operating connection between said electro-thermal device and said regulator device for actuating the latter in one direction only.

14. Furnace control apparatus comprising a furnace regulator device movable in opposite directions and actuated in accordance with furnace temperatures, an expansible element actuated in accordance with room temperatures for actuating said device in opposition to the movement thereof in one direction, and means operatively connecting said element and said device, whereby movement of said device is unopposed in one direction.

15. Heat regulating apparatus comprising in combination, a pressure actuated regulator device actuated by changes in temperature conditions at the furnace, and susceptible of counter pressure adjustment for controlling the furnace at different operating temperatures, of an expansible device for imposing counter pressure on said regulator device, heater means for actuating said expansible device, means responsive to variations in room temperatures for controlling said heater means, and means operatively connecting said expansible device and said regulator device, the said regulator device operating independently of said expansible device when the room temperature reaches a predetermined degree.

16. Heat-regulating apparatus comprising a furnace regulator device, means responsive to variations in furnace temperature for actuating said device in one direction, a thermostat for actuating the said device in the other direction, means responsive to changes in atmospheric temperature for controlling the said thermostat, and means for varying the degree of control exercised by the last-named means.

In testimony whereof I, the said ROBERT E. NEWELL have hereunto set my hand.

ROBERT E. NEWELL.